Sept. 10, 1968     G. KOLOMAYETS ET AL     3,400,935

PHONOGRAPH SPINDLE

Original Filed July 26, 1965

INVENTORS
Allen J. Bury
George Kolomayets

BY Nicholas A. Camasto

United States Patent Office 3,400,935
Patented Sept. 10, 1968

3,400,935
PHONOGRAPH SPINDLE
George Kolomayets, Chicago, and Allen J. Bury, Prospect Heights, Ill., assignors to Admiral Corporation, Chicago, Ill., a corporation of Delaware
Original application July 26, 1965, Ser. No. 474,904, now Patent No. 3,346,261. Divided and this application Aug. 24, 1967, Ser. No. 663,112
2 Claims. (Cl. 274—10)

ABSTRACT OF THE DISCLOSURE

A loose fitting, pinless spindle ejector for an automatic record changing phonograph. The ejector is captivated solely by the walls of the spindle and a return spring.

Disclosure

This is a division of application Ser. No. 474,904, filed July 26, 1965, now U.S. Patent No. 3,346,261 issued Oct. 10, 1967.

This invention relates in general to automatic record changing phonographs, and in particular to the center spindle used in automatic phonographs for supporting and individually ejecting a magazined stack of records. More particularly, the invention is concerned with an improved spindle incorporating a loose fitting, pinless ejector, which is easily manufactured, rapidly and simply assembled, and substantially decreases the need for maintenance or adjustment.

Most commercial automatic phonographs utilize a center spindle incorporating a record ejection mechanism of the pinned type. Pinned spindles are those which have a pivot or guide pin through the spindle body which captivates the ejector within the outer spindle housing. These pins serve as ejector pivots, guides, and in some cases, end stops for limiting ejector movement. When manufacturing pinned-type spindles, difficulties are encountered in toleraces, alignment of the apertures receiving the pins, and clearances. Furthermore, there is the inconvenience and extra expense of an additional part in the form of the pin itself.

Many of these center spindles also use one or more leaf or compression springs within the spindle body to urge the ejector into an inoperative or an "at-rest" position. After extended use, these springs tend to lose their original resilience and occasionally impair proper ejector operation. Internal spindle springs also hamper production, both from a manufacturing and from an assembly standpoint, where special apparatus is required.

In addition, many prior art center spindles translate vertical motion from the automatic phonograph into lateral ejector motion required for proper record ejection. One commonly used type of spindle incorporates a two piece ejector with a cam surface between the pieces which is substantially enclosed by the outer spindle housing. This cam surface is subjected to a relatively heavy load from the magazined stack of records normally supported by the spindle. Consequently, there is a tendency, in many cases, of excessive wear and hence a need for frequent adjustments.

This invention overcomes many of the objections and deficiencies of prior art center spindles. A spindle constructed in accordance with the teachings of this invention has a loose fitting ejector which obviates the need for any pins or rivets through the spindle outer housing or through the ejector itself. Ejector pivotal motion is provided by a pair of laterally opposed convex protrusions or "bumps" on the ejector, which are laterally supported by the outer spindle housing.

The primary object of this invention is to provide a simple, economical, and trouble-free ejector type spindle for incorporation in an automatic record playing phonograph.

A further object of this invention is to provide an improved spindle for use in an automatic phonograph.

A still further object of this invention is to provide an easily assembled ejector spindle for use in an automatic phonograph.

A feature of this invention resides in the use of a loose fitting ejector which eliminates the necessity of pins in the ejector mechanism.

The primary advantage of this invention resides in an ejector type spindle which is extremely economical to manufacture and assemble, and also extremely simple and effective in its mode of operation.

Other objects and advantages of this invention will become apparent upon an examination of the following description taken in conjunction with the accompanying drawings wherein.

Figure 1:
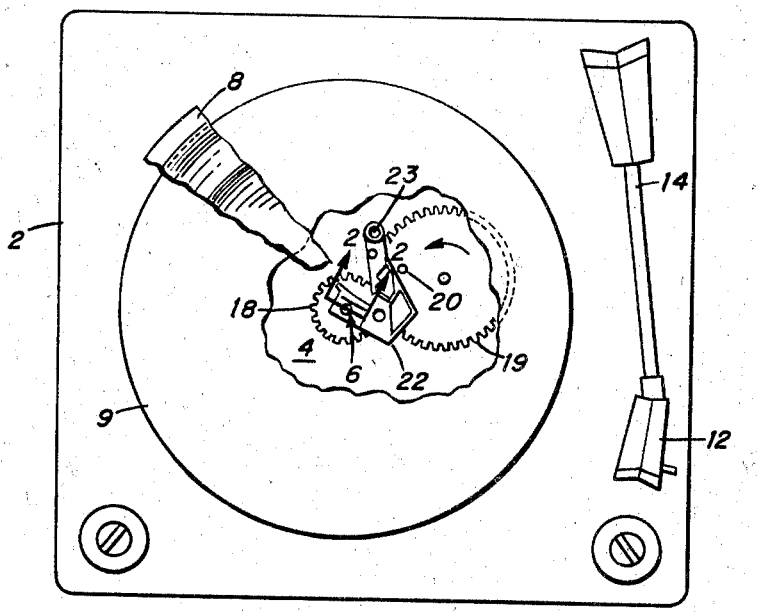
FIG. 1 illustrates a partially cut away top plan view of an automatic phonograph in which the present invention is included.

Refering now to FIG. 1 of the drawings, an automatic record playing phonograph with which the spindle of the invention may be used, generally comprises a pan 2, the central area of which contains a depressed circular portion 4 through which is mounted the spindle (generally referred to by reference numeral 6), for supporting and aligning a magazined stack of records 8 to be played. The pan supports a motor driven turntable 9 rotatably mounted about the spindle, and the turntable supports a record during playing thereof. A record pick-up stylus and cartridge head 12 are secured to the end of a tone arm 14 which is mounted for horizontal and vertical movement on pan 2 by suitable structure (not shown).

Motor driven turntable 9 includes a geared turntable hub 18 permanently affixed to the underside thereof. This gear is engageable with a mutilated driving gear 19 rotatably mounted on the underside of depressed circular portion 4. The mutilated gear is driven through one full revolution by the geared hub during a record changing cycle responsive to initiation thereof by velocity trip means well-known in the art as shown, for example, in the Vistain Patent 2,983,515 granted June 6, 1961.

Mutilated gear 19 includes a driving stud 20 affixed to the upper side thereof. The driving stud rotates with the gear and is positioned for cooperation with an actuation lever 22 pivotably mounted at 23 in a manner clearly shown in the parent of this application, Ser. No. 474,904, filed July 26, 1965.

Center spindle 6 is of generally cylindrical shape and includes an outer housing 24 (FIG. 2) having a lower end 26 and an upper end 28. The lower end includes a hollow inner portion 50 which is interconnected with a longitudinally slotted upper portion 52. The longitudinal slot is carried through the side of the outer housing from a point about midway between the spindle upper and lower end, to the spindle top. A recessed horizontal shelf 53 is provided toward the upper end of the outer housing for supporting the magazined stack of records in an elevated position. The recess communicates with slot 52 providing access through the spindle to the shelf and the records supported thereby. A pinned slider arrangement 54 is retained at the top of the outer housing, above the shelf, and within the longitudinal slot. This slider prevents horizontal movement of all except the lowermost record of the stack in a manner well-known in the art as shown, for example, in the Faulkner Patent 2,498,333, granted Feb. 21, 1950.

An ejector 56, of generally rectangular cross-section and having a length slightly greater than the distance between the shelf and the lower end of the spindle, is loosely mounted for substantially unrestrained movement within the outer housing. The ejector comprises a nose projection 58 at its upper end substantially adjacent shelf 53 for cooperation with the stack of records, and a tail projection 60 below lower end 26 of the outer housing 24. Tail projection 60 cooperates with a return spring 62 and the actuation lever 22 in a manner to be described. The nose and tail projections are connected by an ejector shank 66 which constitutes most of the ejector length.

The ejector shank is provided with a pair of opposed convex protrusions or "bumps" 68 which serve as ejector pivots and are laterally supported by the inner walls of hollow lower portion 50. The cross-section of the outer housing is circular at an area 69 where the ejector bearings are supported, while the cross-section of the pair of opposed convex protrusions is rectangular. Also, the inner diameter of the outer housing is slightly larger than the distance across the protrusions. The cross-sectional difference provides a loose or "sloopy" fit in the area of the ejector pivots. Rotation of the ejector about its longitudinal axis is prevented by the longitudinal slot housing the upper half of the ejector.

Figures 2, 3, 4:
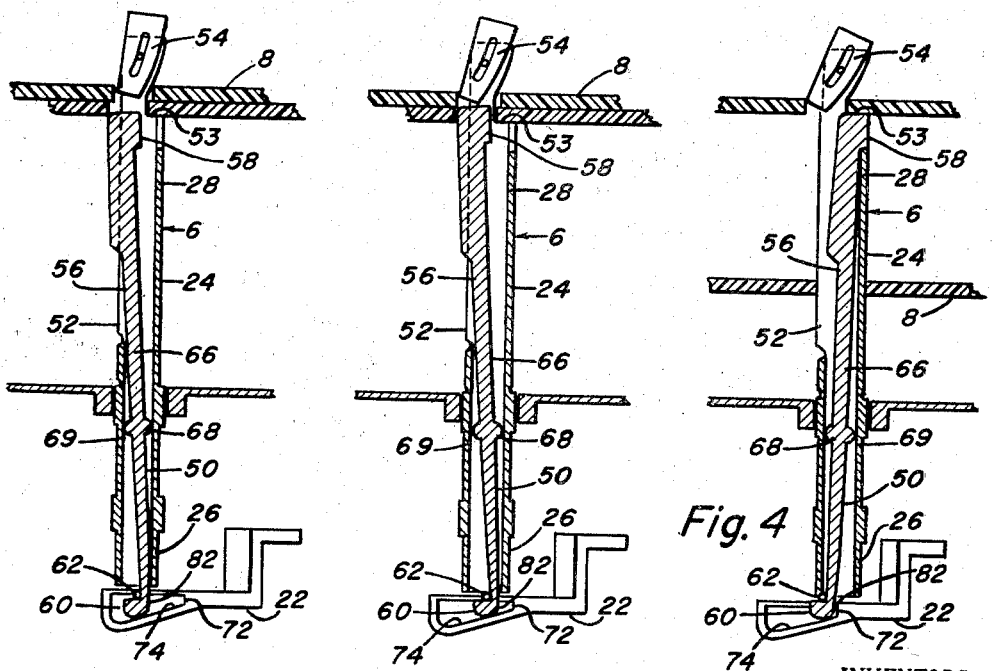
FIG. 2 is a cross-sectional, elevational view taken along line 2—2 of FIG. 1, showing the spindle ejector of the invention and its actuation lever in an inoperative or "at-rest" position.
FIG. 3 is a cross-sectional, elevational view similar to FIG. 2 showing the spindle ejector of the invention in its elevated position.
FIG. 4 is also similar to FIG. 2 but with the ejector and actuation lever in a different operating position.

Return spring 62 is engageable with tail projection 60 of the ejector for maintaining it in an "at-rest" position (FIG. 2). When in the at rest position, nose projection 58 is recessed within the longitudinal slot and away from the shelf.

It should be noted that the ejector is movable to a limited degree in the longitudinal direction when in the spindle housing. Ejector movement is limited in an upward direction by return spring 62 which is hooked above the tail projection and abuts the bottom of the outer housing. Downward movement of the ejector is limited by the actuation lever in a manner yet to be explained.

The concept of a substantially unrestrained ejector is achieved from the lack of pivot pins or the like through the outer housing and the ejector, which would captivate the latter. Instead, the ejector is retained in position by being loosely confined within the outer housing, and vertically supported by the actuation lever. In addition, the ejector pivot points are not fixed, but vary slightly as the ejector changes position within the outer housing.

Still referring to FIG. 2 the actuation lever 22, which is pivotably mounted to the pan, for purposes of explanation, can be assumed to move from right to left. The lever is moved by driving stud 40 as clearly explained in the parent application. For this invention, the important aspects of the actuation lever are a sloped horizontal ejector surface 74 and a vertical ejector pushoff surface 72.

The bottom edge of tail projection 60 of the ejector rests upon and slides along sloped horizontal ejector surface 74 during right to left movement of the actuation lever. The upward slope of this surface imparts an axial movement to the ejector, lifting it upwardly within the outer housing and lifting the top edge of nose projection 58 above horizontal shelf 53 and causing it to enter the spindle aperture of the lowermost record of the stack.

Turning to FIG. 4, further right to left movement of the actuation lever causes vertical ejector push-off surface 76 to contact a back side 82 of the tail projection which imparts a lateral or rocking movement in the clockwise direction to the ejector, with the laterally opposed convex protrusions as the center of rotation. The nose projection 58 obviously moves in a direction opposite that of the tail 60.

Due to the nature of the loosely fitting ejector, the exact points where the ejector contacts the outer housing are difficult to determine. While conditions may vary slightly with various tolerances, it is believed that when the elements are positioned as shown in FIG. 4, the left protrusion contacts the outer housing, and the right side of the ejector just below nose projection 58 limits the ejector rocking movement. For other tolerances, the left side of the ejector shank just above tail 60 might be the movement limit point.

Since nose projection 58 is engaged within the spindle aperture of the lowermost record, when the ejector is rocked in a clockwise direction, this record is shifted laterally off the horizonatl shelf 53 to a position co-axial with the outer housing while the slider arrangement restrains the penultimate record. With the lowermost record in this position, it has lost all vertical support and falls to the turntable under the force of gravity. The penultimate record now rests on the top edge of the nose projection and would force the ejector downwardly but for the actuation lever supporting its lower end.

As the record changing cycle continues, the actuation lever slowly returns to its original position while supporting the ejector which is being forced downwardly by the weight of the records (except when the last record of the stack is dropped). This allows the remaining records to gently rest on the horizontal shelf 53. Also, as the actuation lever returns to its original position the ejector is rocked in a counter-clockwise direction by ejector return spring 62. This movement seats the magazined records securely on the horizontal shelf.

In the invention herein described, all screws and springs within the spindle and all pins through the ejector body have been eliminated. This reduces manufacturing problems and eliminates several areas of wear and malfunction, which in turn eliminates all adjustments with respect to the spindle and spindle ejector movement.

Many modifications and alterations of the invention, far different both in appearance and details of construction from the embodiment herein illustrated, but nevertheless utilizing the basic teachings of the invention, will be readily apparent or devised upon study by persons skilled in the art. Accordingly, the scope of the protection to be afforded should not be limited by the particular embodiment illustrated and described, but should be determined from the description of the essence of the invention which appear in the appended claims.

The embodiments of the invention in which an exclusive property or privilege is claimed are defined as follows:

1. In an automatic record changing phonograph including a horizontal turntable: a stationary spindle having a generally cylindrical outer housing centrally mounted with respect to said turntable, said outer housing including; a hollow lower portion and an axially slotted upper record guide portion having a shelf for supporting a stack of records above said turntable: slider means in said slotted upper portion above said shelf cooperable with said stack of records for laterally restraining all except the lowermost record thereof: a flat ejector loosely fitting within said outer housing and having; an upper extremity adapted for internal engagement with the center hole of a record resting on said shelf and for laterally displacing it from said shelf to a position coaxial with said spindle, whence the record is gravity supplied to said turntable, a pair of laterally opposed convex protrusions intermediate its length providing limited bearing engagements with the interior surface of said hollow lower portion, and a lower extremity partially extending below said hollow lower portion of said spindle: cam means imparting vertical and rocking movements to said lower extremity during a record changing cycle: and spring means normally urging said lower extremity against said hollow lower portion, said ejector being captivated within said spindle by the interior surface of said spindle and said spring means.

2. A phonograph as set forth in claim 1: said cam means including a ramp surface terminating in an abutment: wherein, prior to a record changing cycle, under urging of said spring means said upper extremity of said ejector is maintained beneath and substantially in alignment with the center hole of a record on said shelf: and wherein; during a record changing cycle, said ramp surface elevates said ejector within said center hole, said protrusions sliding along the interior surface of said hollow portion; and said abutment rocks said ejector about said protrusions against the urging of said spring means, to laterally displace said record off said shelf; said ejector being forced downwardly, under control of said ramp surface, to the level of said shelf by the weight of said stack of records.

References Cited
FOREIGN PATENTS

| | | |
|---|---|---|
| 1,028,800 | 4/1958 | Germany. |
| 1,062,951 | 8/1959 | Germany. |
| 590,794 | 4/1959 | Italy. |

HARRY N. HAROIAN, *Primary Examiner.*